(12) United States Patent
Noda et al.

(10) Patent No.: US 11,125,571 B2
(45) Date of Patent: Sep. 21, 2021

(54) ACTION SUPPORT DEVICE AND ACTION SUPPORT METHOD

(71) Applicant: FUJITSU LIMITED, Kawasaki (JP)

(72) Inventors: Masahide Noda, Kawasaki (JP); Junichi Yura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 16/274,344

(22) Filed: Feb. 13, 2019

(65) Prior Publication Data

US 2019/0257662 A1  Aug. 22, 2019

(30) Foreign Application Priority Data

Feb. 16, 2018  (JP) .............................. JP2018-025718

(51) Int. Cl.
*G01C 21/34* (2006.01)
*G06F 16/906* (2019.01)
*G06F 16/909* (2019.01)
*G06F 17/11* (2006.01)

(52) U.S. Cl.
CPC ....... *G01C 21/3415* (2013.01); *G01C 21/343* (2013.01); *G06F 16/906* (2019.01); *G06F 16/909* (2019.01); *G06F 17/11* (2013.01)

(58) Field of Classification Search
CPC . G01C 21/3415; G01C 21/343; G06F 16/906; G06F 16/909; G06F 17/11
USPC .......................................................... 701/533
See application file for complete search history.

(56) References Cited

U.S. PATENT DOCUMENTS

2015/0106011 A1*  4/2015  Nesbitt .............. G01C 21/3679
701/412

FOREIGN PATENT DOCUMENTS

| JP | 10-247213 | 9/1998 |
| JP | 2003-148986 | 5/2003 |
| JP | 2006-258710 | 9/2006 |
| JP | 2007-219747 | 8/2007 |

* cited by examiner

*Primary Examiner* — Gertrude Arthur Jeanglaude
(74) *Attorney, Agent, or Firm* — Fujitsu Patent Center

(57) ABSTRACT

An action support device includes one or more memories, and one or more processors coupled to the one or more memories and the one or more processors configured to calculate, in response to detecting deviation of user's action from a first flow, a plurality of degrees between the first flow and each flow of a plurality of flows generated by changing the first flow, select a second flow from among the plurality of flows in accordance with the plurality of degrees of similarity, and output the selected second flow.

13 Claims, 18 Drawing Sheets

MODEL ROUTE

200

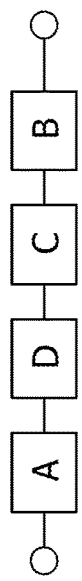
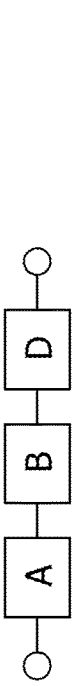
FIG. 5B  MOVE B BEHIND C (OPERATE ONCE)
FIG. 5C  MOVE B BEHIND D (OPERATE ONCE)
FIG. 5D  MOVE B BEHIND C / MOVE D BEHIND A (OPERATE TWICE)
FIG. 5E  DELETE C (OPERATE ONCE)
FIG. 5F  INSERT X BEHIND B (OPERATE ONCE)
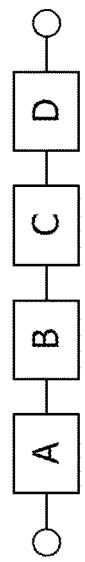
FIG. 5A  ORIGINAL FLOW

FIG. 6

| TASK ID | POSITION | KEYWORD |
|---------|----------|---------|
| SPOT A | (LATITUDE Lat A, LONGITUDE Lng A) | RYOMA SAKAMOTO, SHINTARO NAKAOKA, END OF EDO PERIOD, MONUMENT |
| SPOT B | (LATITUDE Lat B, LONGITUDE Lng B) | RYOMA SAKAMOTO, END OF EDO PERIOD, BUILDING |
| SPOT C | (LATITUDE Lat C, LONGITUDE Lng C) | SHINSEN-GUMI, END OF EDO PERIOD, BUILDING |
| ⋮ | ⋮ | ⋮ |

EXAMPLE OF CALCULATION OF DEGREE OF
CONTENT SIMILARITY BETWEEN FLOWS

DIFFERECES BETWEEN ATTRIBUTES

A-B:1.0   B-C:0.5   C-D:0.7

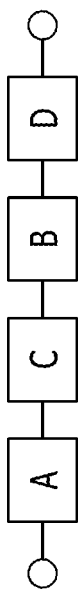

FLOW BEFORE CHANGE

ACCUMULATION OF DIFFERENCES
BETWEEN TASK ATTRIBUTES
= DIFFERENCE BETWEEN A AND B +
DIFFERENCE BETWEEN B AND C +
DIFFERENCE BETWEEN C AND D
= 1.0 + 0.5 + 0.7 = 2.2

(a)

DIFFERECES BETWEEN ATTRIBUTES

A-C:1.7   C-B:0.5   B-D:1.2

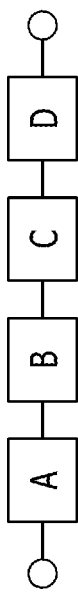

FLOW AFTER CHANGE

ACCUMULATION OF DIFFERENCES
BETWEEN TASK ATTRIBUTES
= DIFFERENCE BETWEEN A AND C +
DIFFERENCE BETWEEN C AND B +
DIFFERENCE BETWEEN B AND D
= 1.7 + 0.5 + 1.2 = 3.4

(b)

DEGREE OF CONTENT SIMILARITY BETWEEN FLOWS
= ABSOLUTE VALUE (ACCUMULATION OF DIFFERENCES BETWEEN TASK ATTRIBUTES OF FLOW AFTER CHANGE
  − ACCUMULATION OF DIFFERENCES BETWEEN TASK ATTRIBUTES OF FLOW BEFORE CHANGE)
= ABSOLUTE VALUE ( 3.4 − 2.2 )
= 1.2

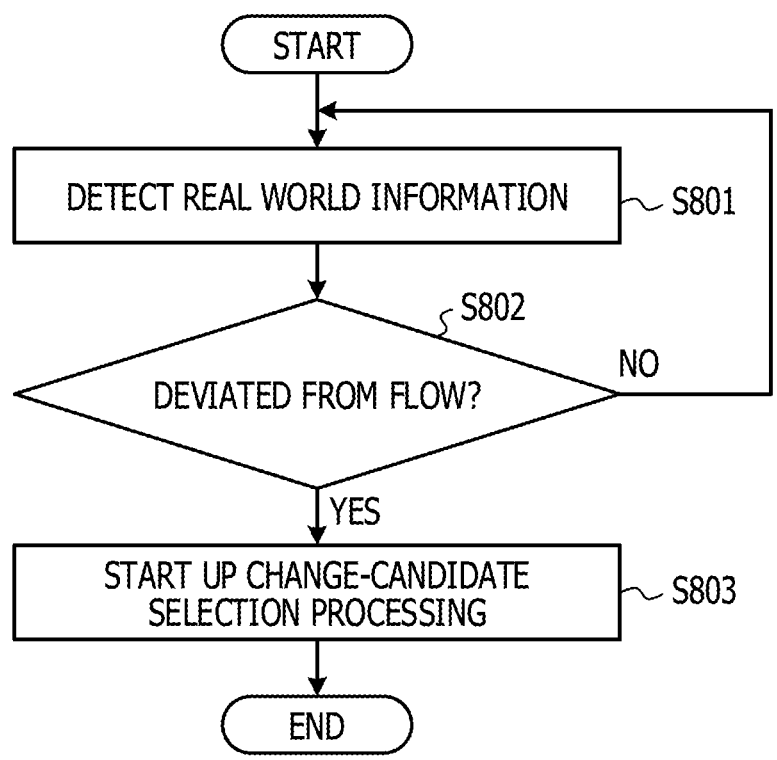

PRESENT HIGH
SIMILARITY ONLY

PRESENT PLURAL PLAN

CURRENT POSITION

EXAMPLE PRESENTING
NEXT TASK ONLY

EXAMPLE PRESENTING
REMAINING TASKS IN FLOW

FIG. 14

| FLOW ID | EXECUTING PERSON | CHANGE INFORMATION | EVALUATION RESULT | ... |
|---|---|---|---|---|
| *** | *** | *** | *** | *** |
| | | | | |
| | | | | |
| | | | | |
| | | | | |

1400

FIG. 16A
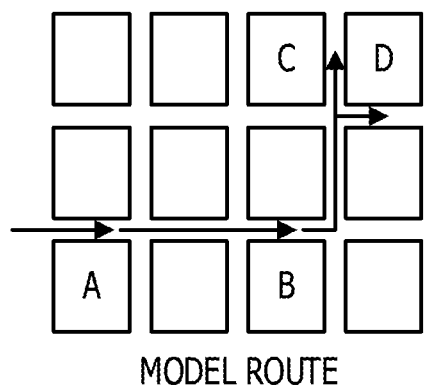
MODEL ROUTE
FIG. 16B
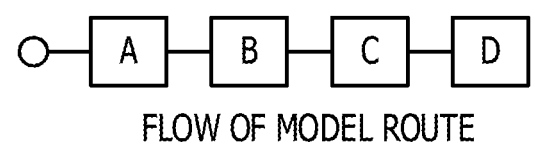
FLOW OF MODEL ROUTE
FIG. 16C
|   | A | B | C | D |
|---|---|---|---|---|
| A | – | 2.5(2/0.5) | 5.5(4/1.5) | 5.5(5/0.8) |
| B |   | – | 2.7(2/0.7) | 4.0(3/1.0) |
| C |   |   | – | 1.3(1/0.3) |
| D |   |   |   | – |

ACTION SUPPORT DEVICE AND ACTION SUPPORT METHOD

CROSS-REFERENCE TO RELATED APPLICATION

This application is based upon and claims the benefit of priority of the prior Japanese Patent Application No. 2018-25718, filed on Feb. 16, 2018, the entire contents of which are incorporated herein by reference.

FIELD

The embodiments discussed herein are related to a technique for action support.

BACKGROUND

For example, an action support technique that supports execution of tasks executed by following a procedure has been developed. In the action support technique, for example, a plurality of tasks executed by following a procedure is described as a flow. A terminal presents to an executing person, for example, content of one of the tasks to be executed next by following the flow. Thus, the execution of the tasks by the executing person is supported.

Related-art techniques are disclosed in, for example, Japanese Laid-open Patent Publication Nos. 2006-258710, 10-247213, 2007-219747, and 2003-148986.

SUMMARY

According to an aspect of the embodiments, an action support device includes one or more memories, and one or more processors coupled to the one or more memories and the one or more processors configured to calculate, in response to detecting deviation of user's action from a first flow, a plurality of degrees between the first flow and each flow of a plurality of flows generated by changing the first flow, select a second flow from among the plurality of flows in accordance with the plurality of degrees of similarity, and output the selected second flow.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A to 5F exemplify change candidates for a flow and the number of times of changing operations;

FIG. 6 exemplifies task attribute information according to the embodiment;

FIG. 7 exemplifies calculation of the degree of content similarity according to the embodiment;

FIG. 8 exemplifies an operating flow of detection processing that detects that the action of a user deviates from the flow according to the embodiment;

FIG. 14 exemplifies change history information in which a history of change having been made to the flow in the past is registered;

FIGS. 16A to 16C illustrate an example to which the embodiment is applied to a flow of a sightseeing route guide;

DESCRIPTION OF EMBODIMENTS

With the related art techniques, when an action of an executing person deviates from a procedure represented by a flow, the executing person is unable to be provided with continued action support.

Hereinafter, some embodiments will be described in detail with reference to the drawings. Corresponding elements in a plurality of drawings are denoted by like reference signs.

Figure 1A:
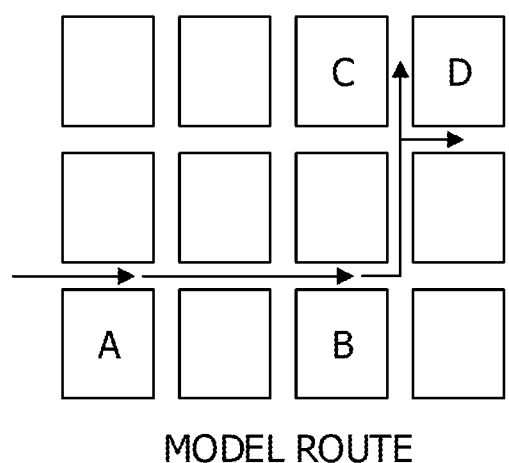
FIGS. 1A and 1B illustrate exemplary action support.
Figure 1B:
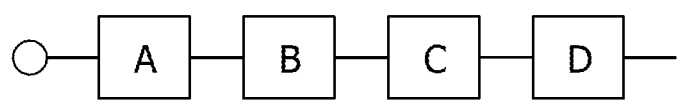

FIGS. 1A and 1B illustrate exemplary action support. FIG. 1A illustrates a route guide for sightseeing. This route guide represents a sightseeing route for visiting spots including spot A, spot B, spot C, and spot D in this order as a model route. FIG. 1B illustrates a flow in accordance with the sightseeing route. In the flow, for example, tasks are associated with the spots. In each task, action support such as a guide for the spot corresponding to the task may be provided. In such a flow, when the user acts so as not to follow the model route indicated by the flow, the flow does not proceed in a task where the user's action deviates from the route. For example, it is assumed that the user goes from spot A to spot C instead of spot B. In this case, the flow stops while remaining waiting for proceeding to spot B. Thus, even when the user visits spot C and then spot D, content of action support such as guides for these spots is not presented. Thus, at a step where the user's action deviates from the flow, the action support is not necessarily provided. Accordingly, it is desired to provide a technique with which the action support is able to be continued even when the user's action deviates from the procedure indicated by the flow.

A flow may reflect an intention of a creator of the flow. For example, the flow includes a knack or the like for attaining an object based on know-how of the creator of the flow. Thus, an action following the flow may bring about more advantages to the user. Examples of the advantages may include, for example, an increase in the degree of satisfaction with sightseeing when the flow is of sightseeing support, improvement in grades due to effective learning when the flow is of self-learning support, and so forth. Accordingly, it is also desired to provide a technique that is able to provide action support maintaining the original flow as much as possible even when the user's action deviates from the procedure indicated by the flow. An embodiment is described hereinafter.

Figure 2:
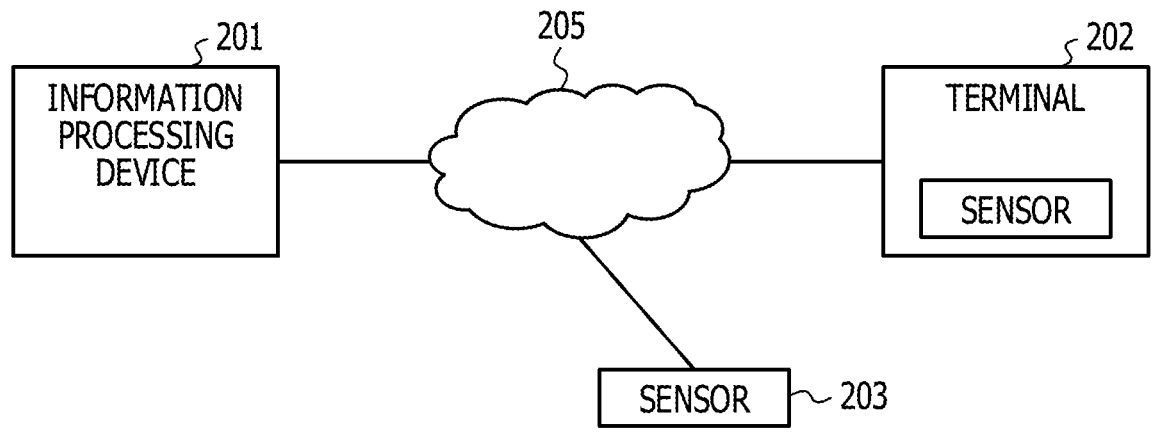
FIG. 2 illustrates an action support system according to an embodiment.

FIG. 2 illustrates an action support system 200 according to the embodiment. The action support system 200 includes, for example, an information processing device 201, a terminal 202, and a sensor 203. The information processing device 201, the terminal 202, and the sensor 203 may be connected to one another through a network 205. Alternatively, the sensor 203 may be provided in the terminal 202. The information processing device 201 may be, for example, a computer such as a server. The terminal 202 may be, for example, a smartphone, a mobile phone device, a tablet terminal, or the like. The terminal 202 is, for example, held by the user as the person who executes the flow. The terminal 202 supports an action of the user. For example, the information processing device 201 notifies the terminal 202 of display information for supporting the action of the user based on the flow indicating the procedure of the action and causes the terminal 202 to display a display screen for supporting the action. The sensor 203 may detect, for example, real world information. The real world information may be used to detect what task of the flow is being executed by the user who holds the terminal 202. The real world information may be, for example, information on the position detected by the sensor 203 such as a global positioning system (GPS) provided in the terminal 202 when the task is a spot for sightseeing or the like. The real world information may be, for example, information on a page being displayed in a display device 404 by the terminal 202 and browsed by the user when the task is a chapter or the like of a learning material being learned. For example, the sensor 203 may be provided in the terminal 202 or provided separately from the terminal 202 in accordance with the real world information to be obtained.

Figure 3:
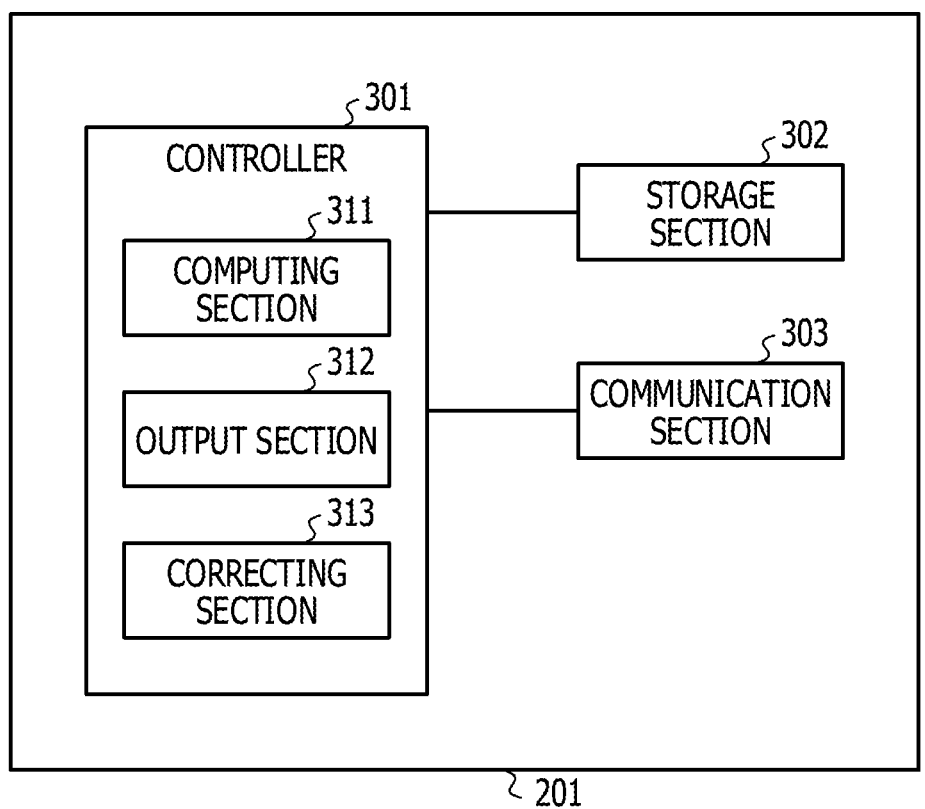
FIG. 3 exemplifies a block configuration of an information processing device according to the embodiment.

FIG. 3 exemplifies a block configuration of the information processing device 201 according to the embodiment. The information processing device 201 includes, for example, a controller 301, a storage section 302, and a communication section 303. The controller 301 operates as, for example, a computing section 311, an output section 312, a correcting section 313, and so forth. The storage section 302 stores, for example, information such as task attribute information 600, which will be described later, and change history information 1400. For example, the communication section 303 communicates with the terminal 202 and the external sensor 203 through the network 205 in accordance with instructions from the controller 301. These elements and information stored in the storage section 302 will be described in detail later.

Figure 4:
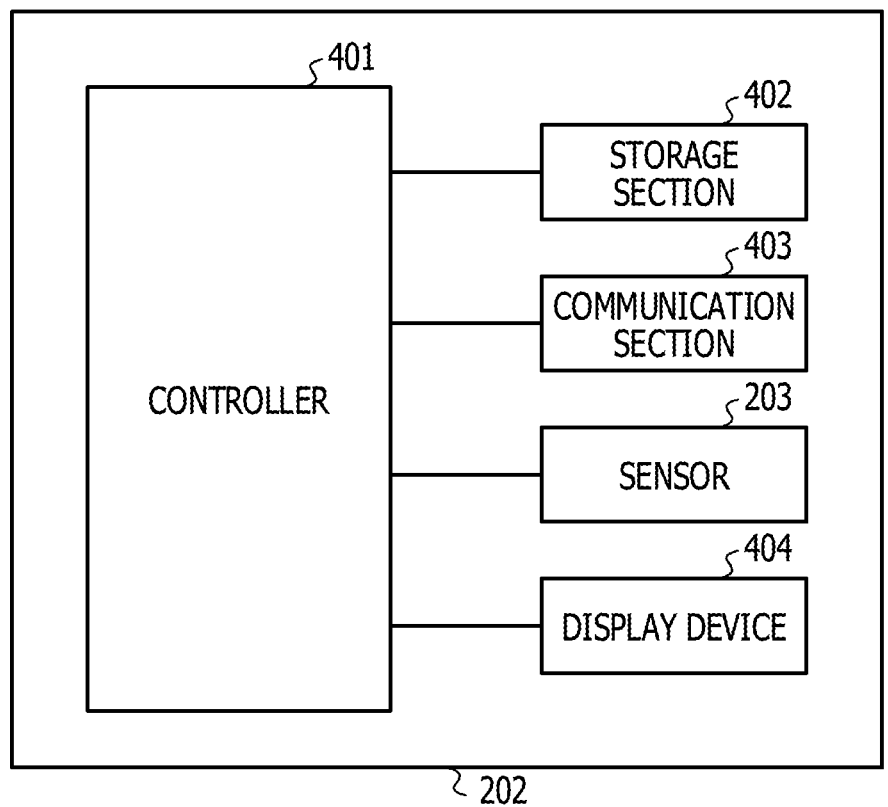
FIG. 4 exemplifies a block configuration of a terminal according to the embodiment.

FIG. 4 exemplifies a block configuration of the terminal 202 according to the embodiment. The terminal 202 includes, for example, a controller 401, a storage section 402, a communication section 403, and the display device 404. The terminal 202 may include the sensor 203. The storage section 402 stores, for example, information used for processing. The sensor 203 may detect, for example, the real world information. For example, the communication section 403 communicates with the information processing device 201 and the external sensor 203 through the network 205 in accordance with instructions from the controller 401. These elements and information stored in the storage section 402 will be described in detail later.

Next, action support according to the embodiment is described. According to the embodiment described below, when the user's action deviates from the procedure indicated by the flow, the controller 301 of the information processing device 201 generates a plurality of flows that are to serve as change candidates. Then, the controller 301 outputs a change-candidate flow or change-candidate flows having high degrees of similarity to the original flow out of the generated flows to serve as a plurality of the change candidates. Accordingly, even when the user' action deviates from the procedure indicated by the flow, the change-candidate flow similar to the original flow is able to be used. Thus, the user may receive continued action support.

Furthermore, since the user is able to use the change-candidate flow having a high degree of similarity to the original flow even when the user's action deviates from the procedure indicated by the flow, the user may receive support with the flow for which the intention of the creator of the flow is maintained as much as possible. Hereinafter, as the degree of similarity between the flows, the degree of structural similarity and the degree of content similarity are exemplified.

<The Degree of Structural Similarity>

The degree of structural similarity is an index that indicates the degree of structural similarity between a graphical structure of an original flow and a graphical structure of a flow that is to serve as a change candidate. For example, the degree of structural similarity may be evaluated based on the number of times of operations performed to change the graphical structure of the original flow into that of a flow that is to serve as the change candidate. In an example, the operations may be three types of operations, that is, movement of a task, deletion of a task, and insertion of a task. For example, the movement is a changing operation so that a task in a flow is executed at a different timing. For example, the deletion is a changing operation not to execute a task in a flow. For example, the insertion is a changing operation so that a new task is executed in the flow. In an example, a change-candidate flow having a high degree of structural similarity is a flow changed from the original flow through a small number of times of operations.

FIGS. 5A to 5F exemplify the change candidates for the flow and the number of times of the changing operations. FIG. 5A illustrates the original flow, and FIGS. 5B to 5F illustrate the change-candidate flows. Here, the following operations are performed in flows in FIGS. 5B to 5F.

5B: Operate once to move task B behind task C;
5C: Operate once to move task B behind task D;
5D: Operate twice to move task B behind task C and move task D behind task A;
5E: Operate once to delete task C; and
5F: Operate once to insert task X behind task B.

The degree of structural similarity may be obtained based on the number of times of the operations required for these changes. In one example, the number of times of the operations may be used as the degree of similarity. In a different embodiment, weights may be assigned to the operations performed on the flows. As an example, when a result of a certain type of the operation performed on a task is against the intention of the designer depending on the type of the flow or the task, the weight may be assigned so as to reduce the degree of similarity of such a type of the operation. For example, as is the case with a flow of self-learning, when carrying out all the tasks is of importance, the weight may be increased by, for example, counting a single deletion operation of a task as three times of the operations. Furthermore, the weight assignment of the operations may be varied in accordance with a situation of the user. For example, in a flow of self-learning, the user may skip a lesson (task) with which the user is sufficiently familiar. Thus, for such a task, the weight may be reduced by, for example, counting a single deletion operation of the task as 0.5 times of the operation. The degree of structural similarity may be calculated by using, for example, an existing graph edit distance method or the like.

<The Degree of Content Similarity>

The degree of content similarity may be represented by using content information obtained by quantifying the difference in attribute between two successive tasks in a flow and accumulating differences in attribute in the entirety of the flow. For example, the degree of similarity is regarded as high when the difference in content information is small between the flow before the change and the flow after the change. For example, the attribute may be information extracted from content for action support provided corresponding to the task. For example, when the action support is to support sightseeing and the task corresponds to a spot, the attribute may include information on the position of the spot, an explanation for a place of interest in the spot, or the like. For example, when the action support is learning support and the task corresponds to, for example, a chapter of a learning material being used in the learning, the attribute may include information on leaning content.

When the attribute is represented by a geographical value such as a position, the geographical distance is able to be used as the distance between the attributes. For example, when the task corresponds to a spot for sightseeing or the like and the attribute includes information on the position (for example, a latitude and a longitude) of the spot, the distance between the positions of spots may be used as the difference in attribute.

For example, when the attribute such as an explanation of a place of interest in a spot or information on learning content includes information represented by character strings, the distance between the character strings is able to be used as the difference between the attributes by arranging the character strings such as words in a vector space.

The obtained distances between the attributes are accumulated throughout the flow, and the accumulated value is used as the content information representing the content of the flow. According to one embodiment, the degree of similarity is regarded as high when the difference in content information is small between the flow before the change and the flow after the change.

Referring to FIGS. 6 to 7, examples of the degree of content similarity are further described hereinafter.

FIG. 6 exemplifies the task attribute information 600 according to the embodiment. Entries including information on the attributes corresponding to the tasks are registered in the task attribute information 600. In the example illustrated in FIG. 6, entries corresponding to the tasks of the flow supporting sightseeing are registered in the task attribute information 600. The entries include attributes such as, for example, task identifiers (IDs), positional information, and keywords. For example, the entries may be registered in the task attribute information 600 in the order following the order of execution of the corresponding flow. The task IDs are, for example, information for identifying the tasks included in the flow. The positional information indicates the positions of the spots visited by executing the tasks in the entries. For example, keywords relating to the spots visited by executing the tasks in the entries are registered as the keywords. FIG. 6 is an example of the task attribute information 600. Another attribute may be registered in the task attribute information 600 in accordance with a target of the action support in the flow.

FIGS. 7A and 7B exemplify calculation of the degree of content similarity according to the embodiment. As described above, for the degree of content similarity, first, the distances between the attributes that indicate the differences between the attributes are calculated between the tasks included in each of the flows, and the distances between the attributes are accumulated throughout the flow so as to obtain the content information. The content information is compared between the flow before the change and the flow after the change. The degree of similarity is regarded to increase as the difference in content information reduces. First, calculation of the distances between the attributes that indicate the differences between the attributes performed between the tasks is described.

1. When the Attributes are Represented by Geographical Values

When the attributes are represented by geographical values, the geographical distance is able to be used as the distance between the attributes. Examples of the geographical values able to be used include, for example, a latitude and a longitude, an address, and so forth. When the geographical distance is used, the distance along the road or the difference in level may be considered instead of the distance in a straight line.

2. When the Attributes are Represented by Character Strings

When the attributes are represented by character strings, words included in the character strings are arranged in the vector space, and the distance between the words in the vector space is measured. The measured distance is able to be used as the distance between the attributes. The arrangement of words in the vector space is able to be executed by using an existing technique such as Word2vec.

The accumulated total of the distances between the attributes of a plurality of the tasks included in the flow is able to be used as the content information indicating the content of the flow. For example, FIG. 7A exemplifies the flow before a change. In this flow, the tasks before the change are order as follows: A, B, C, then D. In this case, the accumulation of the differences between the attributes of the tasks is able to be calculated as follows: difference between A and B, 1.0, +difference between B and C, 0.5, +difference between C and D, 0.7. In the example illustrated in FIG. 7A, the content information is 1.0+0.5+0.7=2.2.

FIG. 7B exemplifies the flow after the change in which task B and task C change places with each other, and accordingly, the tasks are ordered as follows: A, C, B, then D. In this case, the accumulation of the differences between the attributes of the tasks is able to be calculated as follows: difference between A and C, 1.7, +difference between C and B, 0.5, +difference between B and D, 1.2. In the example illustrated in FIG. 7B, the content information is 1.7+0.5+1.2=3.4.

Accordingly, the size of the difference in content information between the flow before the change illustrated in FIG. 7A and the flow after the change illustrated in FIG. 7B is 3.4-2.2=1.2. This value of 1.2 is able to be used as a value indicating the degree of content similarity. The degree of content similarity may be obtained by using the distances between different types of a plurality of the attributes such as, for example, the geographical distances and the distances between words depending on the embodiments. In this case, the sum of the distances between the geographical attributes and attribute distances between the words is able to be used as the distances between the attributes of the tasks. Furthermore, when the distances are obtained from a plurality of types of the attributes, in order to equalizing the rates of contribution of the distances obtained from the various types of the attributes to the content information, the distances of the attributes may be normalized so as to obtain the sum. According to a different embodiment, the rate or rates of contribution of a subset of the attributes to the content information may be increased for focusing on the subset of the plurality of attributes.

Referring next to FIGS. 8 to 12, processing for outputting the change-candidate flows according to the embodiment is described.

FIG. 8 exemplifies an operating flow of detection processing that detects that the action of the user deviates from the flow according to the embodiment. For example, the controller 301 may start the operating flow illustrated in FIG. 8 when the action support with the flow for the user is started.

In step 801 (The term "step" is abbreviated as "S" hereinafter. For example, step 801 is referred to as "S801".), the controller 301 receives the real world information from the terminal 202 or the sensor 203. As has been described, the real world information may be used to detect which of the tasks of the flow is being executed by the user who holds the terminal 202. The real world information may be, for example, information on the position detected by the sensor 203 such as a GPS provided in the terminal 202 when the task is a spot for sightseeing or the like. The real world information may be, for example, information on a page that is being displayed in the display device 404 by the terminal 202 and browsed by the user when the task is a chapter or the like of a learning material being learned.

In S802, the controller 301 determines, based on the received real world information, whether the action of the user has deviated from the flow. When the user's action has not deviated from the flow ("NO" in S802), the operating flow returns to S801. In contrast, when the user's action has deviated from the flow ("YES" in S802), the operating flow proceeds to S803.

In S803, based on the unexecuted tasks, the controller 301 starts up change candidate selection processing that selects the change candidates for the flow, and this operating flow ends. The controller 301 may restart a new operating flow illustrated in FIG. 8 when the action support for the user is started in a new flow selected by the change-candidate selection processing.

As has been described, with the operating flow illustrated in FIG. 8, upon detecting deviation of the user's action from the flow, the controller 301 starts the flow change candidate selection processing based on the real world information.

Figure 9:
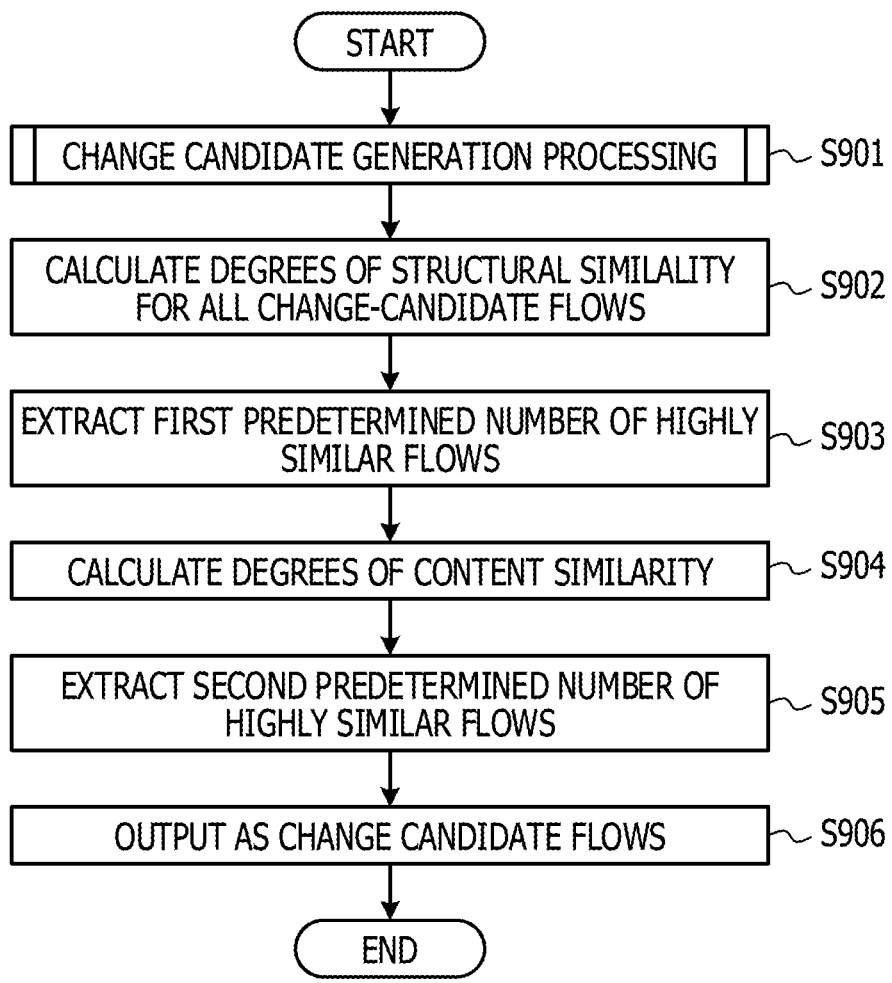
FIG. 9 exemplifies an operating flow of flow change candidate selection processing according to the embodiment.

FIG. 9 exemplifies an operating flow of the flow change candidate selection processing according to the embodiment. The operating flow illustrated in FIG. 9 may be started up by the processing in S803.

In S901, based on the unexecuted tasks, the controller 301 performs flow change candidate generation processing that generates the change candidates of the flow. The details of the change-candidate generation processing will be described later with reference to FIG. 12. The change-candidate generation processing generates a plurality of the flows that are to serve as the change candidates.

In S902, the controller 301 compares each of the plurality of the generated flows that are to serve as the change candidates with the original flow so as to calculate the degree of structural similarity of the generated flow. For example, degrees of structural similarity may be calculated based on the number of times of the operations as exemplified with reference to FIGS. 5A to 5F.

In S903, the controller 301 extracts a first predetermined number of the flows having high degrees of structural similarity out of the plurality of the flows that are to serve as the change candidates.

In S904, the controller 301 compares each of the first predetermined number of the highly similar flows with the original flow so as to calculate the degree of content similarity of the highly similar flow. For example, the degrees of content similarity may be calculated based on the attributes of the task attribute information 600 as exemplified in FIGS. 6 to 7B.

In S905, the controller 301 extracts a second predetermined number of the flows having high content similarity out of the first predetermined number of the highly similar flows. The second predetermined number may be smaller than the first predetermined number.

In S906, the controller 301 outputs the second predetermined number of the flows as the change-candidate flows. Thus, this operating flow ends.

In S906, regarding the destination of the output of the second predetermined number of the change-candidate flows, for example, the controller 301 stores the output in the storage section 302 or transmits the output to the terminal 202 so as to cause the display device 404 of the terminal 202 to output.

Furthermore, the controller 401 of the terminal 202 may cause the display device 404 to display the second predetermined number of the change-candidate flows so as to allow the user to select the flow from the displayed flows, or the controller 401 may cause a single flow having a highest degree of content similarity to be displayed.

Figure 10A:
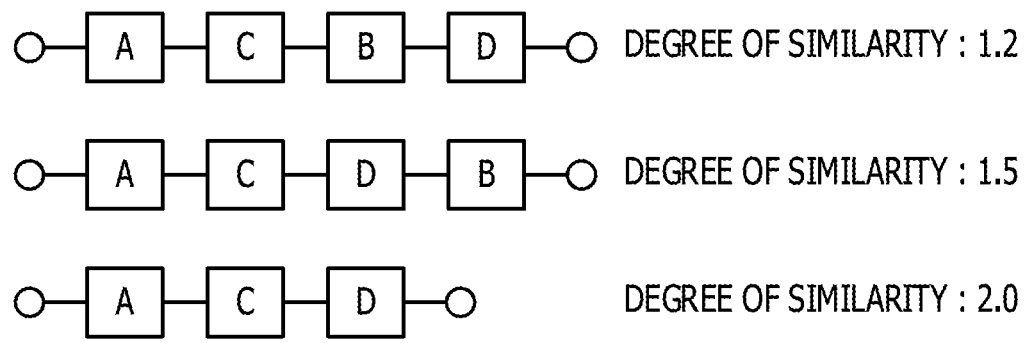
FIGS. 10A to 10C exemplify display of change-candidate flows in a display device.
Figure 10B:
Figure 10C:
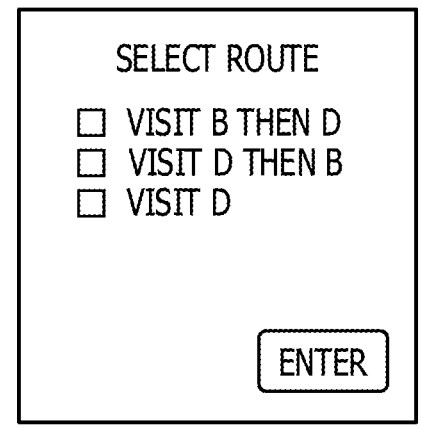

FIGS. 10A to 10C exemplify the display of the change-candidate flows in the display device 404. FIG. 10A illustrates three change-candidate flows arranged in an ascending order of the degrees of content similarity (from higher similarity) from the top. In the examples illustrated in FIG. 10A, the original flow is a sightseeing flow in the order of A, B, C, then D, and three candidates for reordering are presented as a result of user's visit to C after A (the user currently stays at C). In this case, the controller 401 of the terminal 202 may display a display screen that presents, as illustrated in FIG. 10B, a destination B being the next destination in accordance with the uppermost flow having a highest similarity, that is, a flow in the order of A, C, B, then D. When a route having a highest similarity is presented, the user does not necessarily take time to think about. Alternatively, the controller 401 of the terminal 202 may display a display screen that presents, as illustrated in FIG. 10C, routes of three change-candidate flows so as to allow the user to select a flow. When a plurality of the change candidates are presented so as to allow the selection by the user, obtrusiveness to the user may be reduced.

Figure 11A:
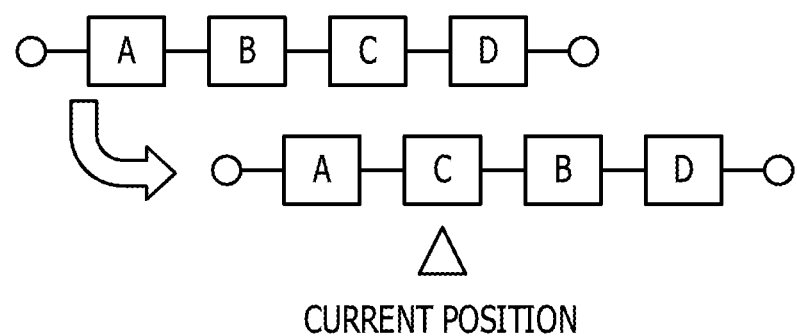
FIGS. 11A to 11C exemplify variations of the display of the flow.
Figure 11B:
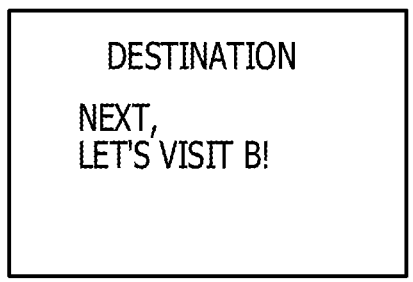
Figure 11C:
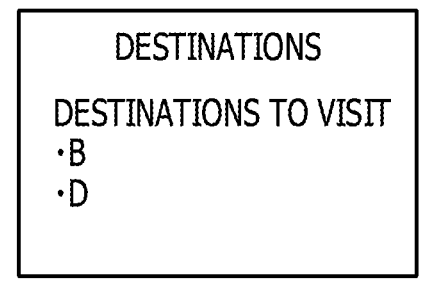

Also when one of the change-candidate flows to which the flow is actually changed for use is determined and the action support with this determined flow starts, the display for the user may vary in different manners depending on, for example, a visible unit in the display, the number of visible tasks, and so forth. FIGS. 11A to 11C exemplify variations of the display of the flow. For example, as illustrated in FIG. 11A, it is assumed that the user currently stays at C when the flow in the order of A, B, C, then D is reordered into a flow in the order of A, C, B, then D. In this case, for example, when only one of the tasks to be executed next in the actually changed flow for use is visible as illustrated in FIG. 11B, the user may focus on what the user will do next. Meanwhile, for example, when the entirety of the actually changed flow for use is visible as illustrated in FIG. 11C, the user may easily grasp an entire plan.

Figure 12:
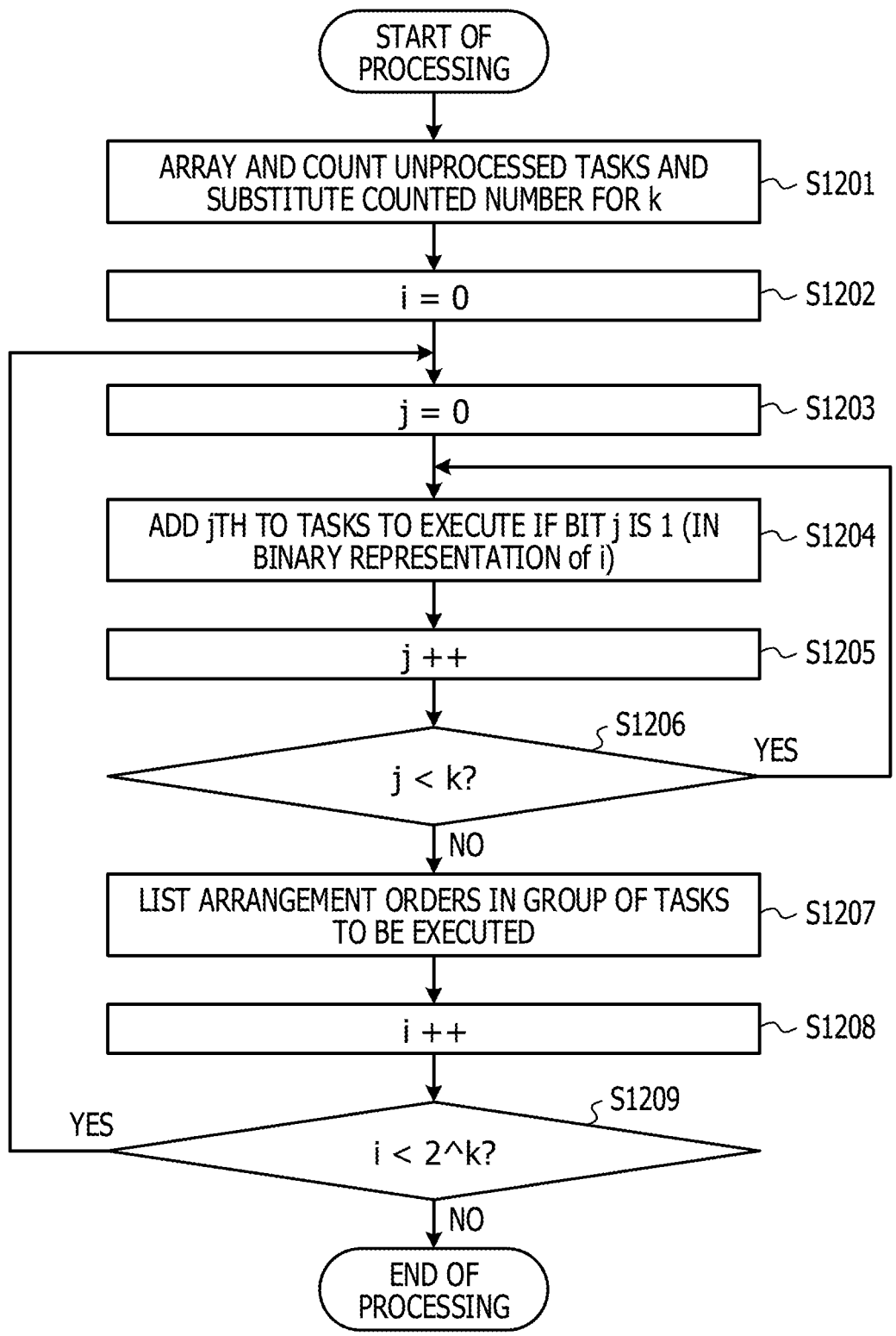
FIG. 12 exemplifies an operating flow of change-candidate flow generation processing according to the embodiment.

Referring next to FIG. 12, an example of the generation processing for the change-candidate flows according to the embodiment is described. FIG. 12 exemplifies an operating flow of the change-candidate flow generation processing according to the embodiment. The controller 301 may start an operating flow illustrated in FIG. 12 when, for example, the processing proceeds to S901.

In S1201, the controller 301 extracts the unprocessed tasks in the flow at the time when the deviation of the user's action from the flow is detected. Here, the number of the unprocessed tasks is assumed to be k. In this case, when each of k tasks is set to be executed or not to be executed, there are $2^k$ combinations of the tasks. When the values from 0 to $2^k$ are represented in binary, the value of any one of bits is able to be used as a value representing the state of the task to be executed or not to be executed.

For example, when the unprocessed tasks are two tasks, that is, task A and task B, k=2. Thus, $2^k=2^2=4$. The representation of this in binary is, 00, 01, 10, 11. Here, it is assumed that the number in the one's place represents whether to execute the task A, that is, when the number in the one's place is 1, the task A is to be executed, and when the number in the one's place is 0, the task A is not to be executed. Likewise, it is assumed that the number in the ten's place represents whether to execute the task B, that is, when the number in the ten's place is 1, the task B is to be executed, and when the number in the ten's place is 0, the task B is not to be executed. All the combinations of the unprocessed tasks with consideration for the executing/non-executing of each task are able to be obtained by making the bits and the executing/non-executing of the tasks correspond to one another as described above.

In S1202, the controller 301 sets i=0, and first, starts from extracting the tasks to be executed when 0 is represented in binary. In S1203, the controller 301 sets j=0, and makes the task corresponding to 0th bit as a processing target.

In S1204, the controller 301 determines whether the value of the bit of the digit corresponding to j is 0 or 1, and when the value is 1, the controller 301 sets the task corresponding to the bit of the digit of the value as an executing target. In contrast, when the value is 0, the controller 301 does not set the task corresponding to the bit of the digit of the value as the executing target. In S1205, the controller 301 adds 1 to j and changes the processing target into the bit of the next digit.

In S1206, the controller 301 determines whether the value of j is smaller than k so as to determine whether all the unprocessed tasks have been determined to be executed or not to be executed. When the value of j is smaller than k In S1206 ("YES" in S1206), there is an unprocessed task or unprocessed tasks that have not been determined to be executed or not to be executed. Thus, the processing returns to S1204 of the operating flow. In contrast, when the value of j is not smaller than k in S1206 ("NO" in S1206), all the unprocessed tasks have been determined to be executed or not to be executed. Thus, the processing proceeds to S1207 of the operating flow.

In S1207, the controller 301 generates through repeating processing of S1203 to S1206 the flows of all the permutations of the tasks extracted as processing targets. For example, the controller 301 may store the flows of all the generated permutations in the storage section 302.

In S1208, the controller 301 adds 1 to i and updates the processing to the next value. In S1209, the controller 301 determines whether i is smaller than $2^k$ so as to determine whether the processing has been performed on the combinations of the tasks to be executed and the tasks not to be executed corresponding to all the values. When the processing has not been performed on a subset of the combinations of the tasks to be executed and the tasks not to be executed corresponding to all the values ("YES" in S1209), the operating flow returns to S1203, and the processing is performed on the combination of the task to be executed and the task not to be executed corresponding to the next value of i. In contrast, when the processing has been performed on the combinations of the tasks to be executed and the tasks not to be executed corresponding to all the values ("NO" in S1209), the operating flow in this part ends, and the processing proceeds to S902.

For example, as has been described, with the operating flow illustrated in FIG. 12, the controller 301 is able to list the plurality of flows of the unprocessed tasks reordered in all the possible orders.

As described above with reference to the operating flows illustrated in FIGS. 8, 9, and 12, the controller 301 of the information processing device 201 may present change-candidate flows having high degrees of similarity of flow when deviation of the user's action from the flow is detected. Accordingly, the user whose an action deviates from the flow may still receive the action support in accordance with the flow. This may increase convenience for the user. Furthermore, progress of the user whose an action deviates from the flow may be managed by using the changed flow. This may increase convenience for an administrator.

Although the change-candidate flows are extracted based on the degrees of structural similarity, and then the change-candidate flows are further extracted based on the degrees of content similarity in the operating flow illustrated in FIG. 9 according to the above-described embodiment, the embodiment is not limited to this. For example, according to another embodiment, the controller 301 may extract the change-candidate flows based on the degrees of content similarity and then further extract the change-candidate flows based on the degrees of structural similarity. Alternatively, according to yet another embodiment, the change-candidate flows may be extracted based on the degrees of structural similarity or the degrees of content similarity.

(Variations)

Figure 13:
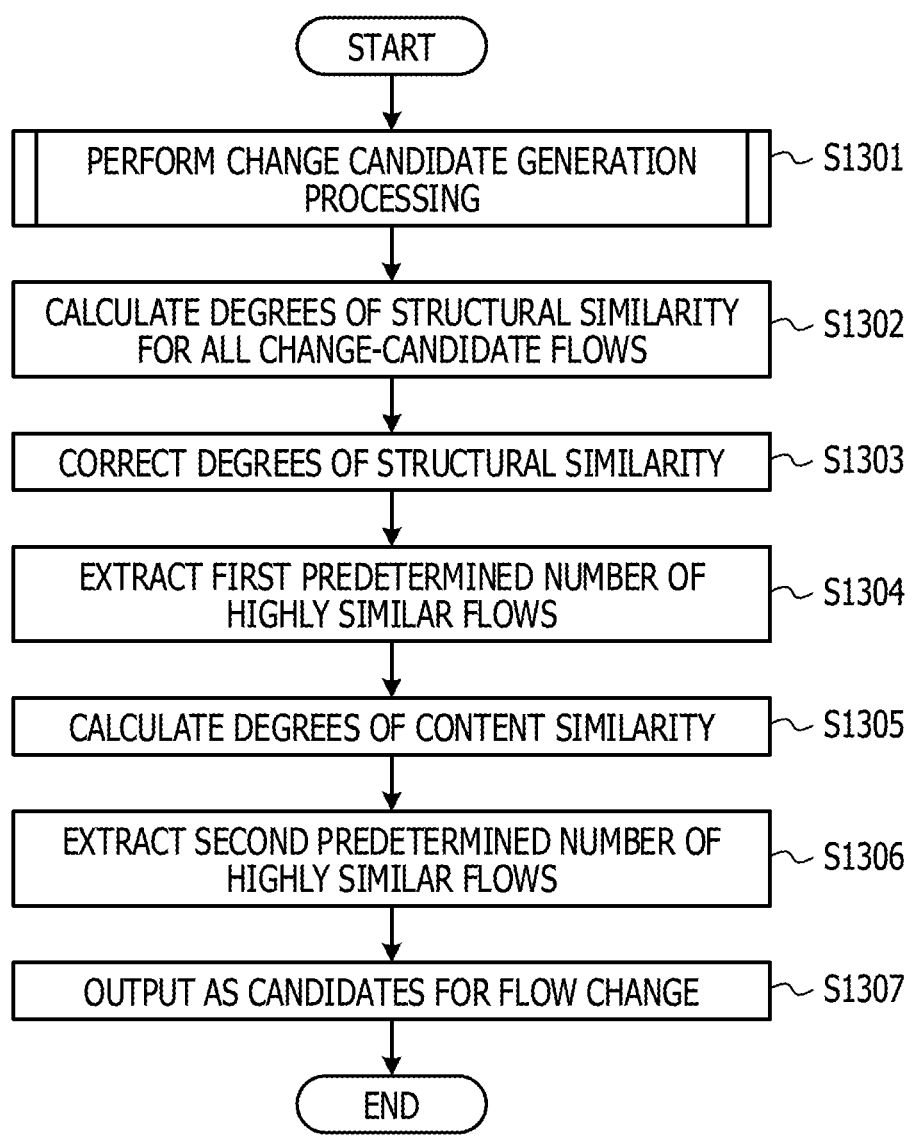
FIG. 13 exemplifies an operating flow of flow change candidate selection processing according to a variation of the embodiment.

Next, an embodiment of a variation that corrects the degree of structural similarity is described. FIG. 13 exemplifies an operating flow of the flow change-candidate generation processing according to the embodiment of the variation. For example, the operating flow illustrated in FIG. 13 may be started up by the processing of S803 described above.

The processing from S1301 to S1302 and from S1304 to S1307 may correspond to the processing from S901 to S906, and the controller 301 may perform processing that is the same as or similar to the processing from S901 to S906.

However, with the flow change-candidate generation processing according to the embodiment of the variation, when the degrees of structural similarity have been calculated in S1302, the controller 301 corrects in S1303 the calculated degrees of structural similarity. For example, the controller 301 may correct the degree of structural similarity based on a history of change having been made to the flows in the past.

FIG. 14 exemplifies the change history information 1400 in which the history of change having been made to the flow in the past is registered. For example, in the example illustrated in FIG. 14, an entry including a flow ID, the executing person, change information, and information on an evaluation result is registered in the change history information 1400. The flow ID is an identifier for identifying a flow corresponding to the entry. The executing person is information for identifying the user for whom the change has been made to the flow corresponding to the entry. The change information indicates the content of the change having been made to the flow corresponding to the entry. For example, the change information may be represented by information of all the operations performed on the original flow. For example, an evaluation by the executing person for the change may be registered in the evaluation result. According to another embodiment, information other than the above-described information may be registered in the change history information 1400.

In S1303, the controller 301 may correct the degrees of structural similarity by referring to the change history information 1400. For example, it is assumed that the controller 301 has made the same change to a flow greater than or equal to than a fixed number or of times in the past for the user whose an action deviates from this flow in S902 according to the change history information 1400. In this case, it is recognized that this user's action tends to cause such a change to be made. Accordingly, correction may be made so as to reduce the value of the degree of structural similarity for this change, thereby increasing the degree of similarity of the flow.

For example, it is assumed that, when the user's action deviated from a flow in S902 according to the change history information 1400, the controller 301 has made the same change to this flow greater than or equal to a fixed number of times in the past. In this case, it is recognized that the user who uses this flow thinks that such a change made to the flow is preferred. Accordingly, correction may be made so as to reduce the value of degree of structural similarity for this change, thereby increasing the degree of similarity of the flow.

For example, when the user's action deviates from the flow in S902 and the change history information 1400 includes a highly evaluated change for the flow, the controller 301 may make correction so as to reduce the value of the degree of structural similarity of the change candidate. In contrast, the controller 301 may make correction so as to increase the value of the degree of structural similarity of a change candidate of low evaluation. This may facilitate making a highly evaluated useful change.

As described above, according to the embodiment of the variation, the controller 301 corrects the value of the degree of structural similarity of the change-candidate flow based on the change history having been made to the flow in the past. Thus, the change-candidate flow may be selected and suggested in accordance with the tendency of the user and evaluation by the user.

Figure 15:
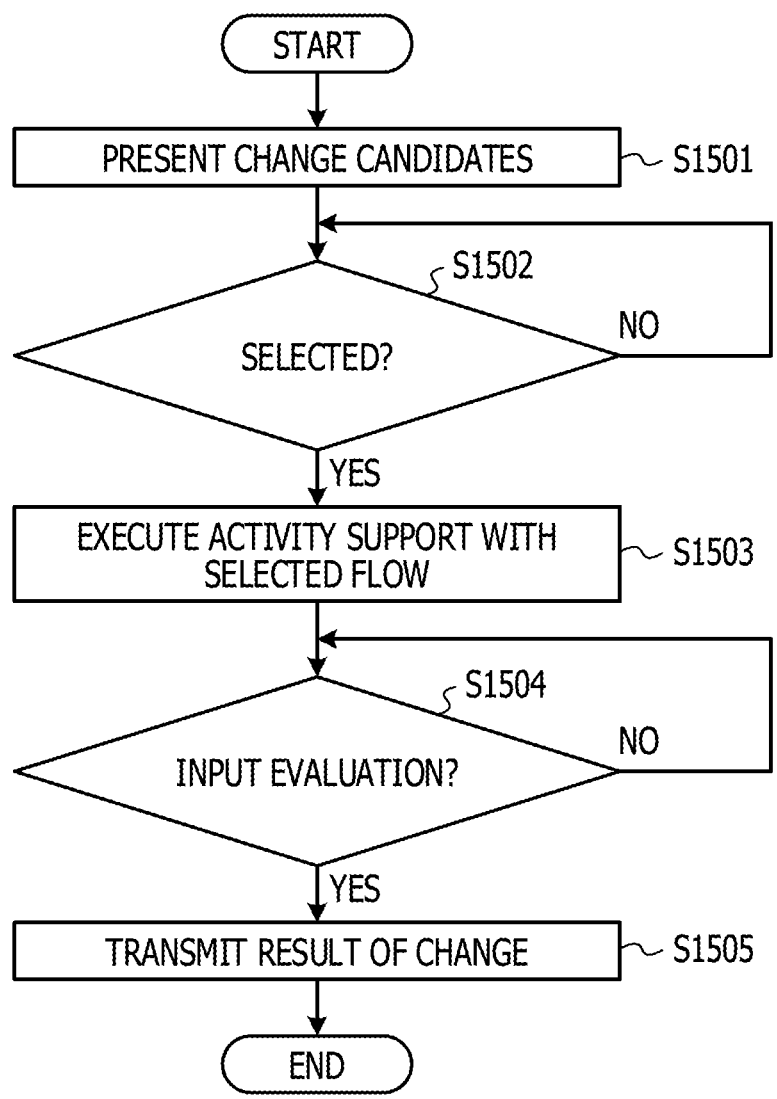
FIG. 15 exemplifies notifying processing of a change result performed by a controller of the terminal according to the embodiment.

FIG. 15 exemplifies notifying processing of a change result performed by the controller 401 of the terminal 202 according to the embodiment. For example, upon receiving the output of the change-candidate flows in S906 or S1307, the controller 401 may start an operating flow illustrated in FIG. 15.

In S1501, the controller 401 presents to the user the change-candidate flows received from the information processing device 201 by, for example, displaying in the display screen of the display device 404. In S1502, the controller 401 accepts input of selection of a flow to be used out of the change-candidate flows. When selection of the flow is not input by the user ("NO" in S1502), the controller 401 repeatedly performs the processing in S1502. When the user selects the flow ("YES" in S1502), the operating flow proceeds to S1503. In S1503, the controller 401 notifies the information processing device 201 of the selected flow and performs the action support with the selected flow in accordance with instructions from the information processing device 201.

In S1504, the controller 401 accepts input of an evaluation result of the action support performed with the selected flow. When the evaluation result is not input ("NO" in S1504), the controller 401 repeatedly performs the processing in S1504. When the evaluation result is input ("YES" in S1504), the operating flow proceeds to S1505. In S1505, the controller 401 notifies the information processing device 201 of the selected flow and the evaluation result of the selected flow. Thus, this operating flow ends. When the controller 301 of the information processing device 201 receives the notification of the selected flow and the evaluation result of the selected flow, the controller 301 may register an entry in the change history information 1400 in accordance with information on the original flow before the change, the selected flow, and the evaluation result.

As described above, when the user's action deviates from the flow, the administrator of the information processing device 201 is notified of information on the changed flow having been used, information on the evaluation result, and so forth. Thus, such information may be used for, for example, revising the flow, and accordingly, improvement of the flow may be facilitated.

Next, examples according to the above-described embodiment will be described.

EXAMPLE 1

FIGS. 16A to 16C illustrate an example to which the embodiment is applied to a flow of a sightseeing route guide. As illustrated in FIG. 16A, a model route of sightseeing is A to B to C to D, and a flow of the model route is illustrated in FIG. 16B. Here, it is assumed that the fact that the user having visited A then goes to C without visiting B is detected. In this case, in the flow, the user starts C without doing B. Thus, the flow has been determined in A to C, and unprocessed tasks B and D are subjected to change.

In terms of the degree of structural similarity, routes with which the change is realizable by a single operation are as follows, and the three flows below may be extracted based on the degrees of structural similarity.

Route with B deleted: A to C to D
Route with B moved behind C: A to C to B to D
Route with B moved behind D: A to C to D to B.

In terms of the degree of content similarity, it is assumed that the results of calculation of the degrees of similarity with the original flow are as illustrated in FIG. 16C. Referring FIG. 16C, the results of calculation of the degrees of content similarity are registered, and "differences between the attributes of the tasks (geographical distances/distances between words)" are registered in cells. The differences between the attributes of the tasks are each represented as the sum of the geographical distance between the spots and the distance in word between the spots. The calculation of the degrees of content similarity of the flows in accordance with FIG. 16C is as follows.

Route with $B$ deleted: $(5.5+1.3)-(2.5+2.7+1.3)=0.3$

Route with $B$ moved behind $C$: $(5.5+2.7+4.0)-(2.5+2.7+1.3)=5.7$

Route with B moved behind D: (5.5+1.3+4.0)−(2.5+2.7+1.3)=4.3.

Thus, the controller 301 is able to determine that the difference is smallest, and accordingly, the degree of similarity is high with the route where B is deleted.

EXAMPLE 2

Figure 17:
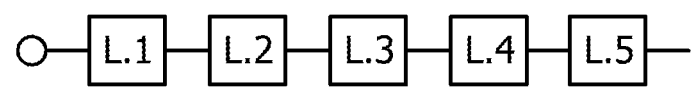
FIG. 17 illustrates an example to which the embodiment is applied to a flow of self-learning.

FIG. 17 illustrates an example to which the embodiment is applied to a flow of self-learning. When a flow of self-learning is designed, the flow may be designed by a designer of the flow so that "leaning lessons sequentially from the top is able to realize efficient learning". Here, for example, it is assumed that the user skips lesson 2 and starts lesson 3 for some reason (such as time, convenience of the circumstance, or the like). In this case, the change of the flow is discussed in view of, for example, whether to learn skipped lesson 2, and where to learn lesson 2 when lesson 2 is to be learned (for example, after lesson 3 or lesson 4). Examples of calculation of the degrees of similarity with the flows after the change in this case are described below.

First, as a premise, for example, in the case where it is thought to be important for the user to execute all the tasks as is the case with self-learning, it is thought that the degree of similarity with a flow generated by deleting operation is reduced. In this case, when the flows are narrowed by calculating the degrees of structural similarity, flows generated not by the deleting operation out of flows generated by a single operation are extracted (the flow generated by the deleting operation is excluded due to reduction in the degree of structural similarity by the deleting operation).

Move L2 behind L3
Move L2 behind L4
(Reference: L2 is skipped and deleted).

The calculation of the degrees of content similarity of these flows is, for example, as follows.

Move L2 behind L3: L1–(2) to L3–(1) to L2–(2) to L4–(1) to L5; the accumulated total is 6.0.

Move L2 behind L4: L1–(2) to L3–(1) to L4–(2) to L2–(3) to L5; the accumulated total is 8.0.

(Reference: Skip and delete L2: L1–(2) to L3–(1) to L4–(1) to L5; the accumulated total is 4.0).

The degree of content similarity of the flow from L1 to L5 before the change is 4.0 as follows: 4.0(L1–(1) to L2–(1) to L3–(1) to L4–(1) to L5). Although the flow indicating the degree of content similarity closest to 4.0 is "skip and delete L2" in the above description, the flow generated by the deleting operation is excluded in the selection of the flows based on the degrees of structural similarity. Thus, the flow generated by "move L2 behind L3" may be selected as a flow indicating the closest value of the degree of content similarity.

As described above, according to Example 2, a change which makes, for example, efficient learning difficult such as a larger change in the order of learning or skipping of a lesson reduces the similarity, and accordingly, degrades evaluation of the change candidate.

As described above, according to the above-described embodiment, upon detecting deviation of the user's action from a flow, the controller 301 presents to the user change-candidate flows having high similarity with the flow. Thus, the action support for the user may be continued. As a result, progress of the user whose an action deviates from the flow may be managed by using the changed new flow. This may increase convenience for the administrator. Also, the administrator is notified of statistical information of the user whose an action deviates from the flow together with a reordering result. This may facilitate revising of the flows, and accordingly, increase convenience for the flow designer, the user, and the administrator.

The controller 301 of the information processing device 201 may operate as the computing section 311 in the processing in, for example, S902, S904, S1302, and S1305 according to the above-described embodiment. Furthermore, the controller 301 of the information processing device 201 may operate as the output section 312 in the processing in, for example, S906 and S1307. The controller 301 of the information processing device 201 may operate as the correcting section 313 in the processing in, for example, S1303.

Although the example of the embodiment has been described, the embodiment is not limited to this. For example, the operating flows described above are exemplary, and the embodiment is not limited to these. Where possible, the order of performing the types of processing in the operating flows may be changed, the operating flow may further include a different type of processing, or a subset of the types of the processing may be omitted. For example, the processing in S902 and the processing in S904 illustrated in FIG. 9 may change places so as to extract the flows based on the degrees of structural similarity after extracting the flows based on the degrees of content similarity.

In the example having been described according to the above-described embodiment, the information processing device 201 performs the processing such as calculation of the degrees of similarity and selection of the change-candidate flows. However, the embodiment is not limited to this. The embodiment may be implemented by another configuration of the action support system 200. For example, according to another embodiment, the entirety of the above-described processing performed by the information processing device 201 may be implemented in the terminal 202.

Figure 18:
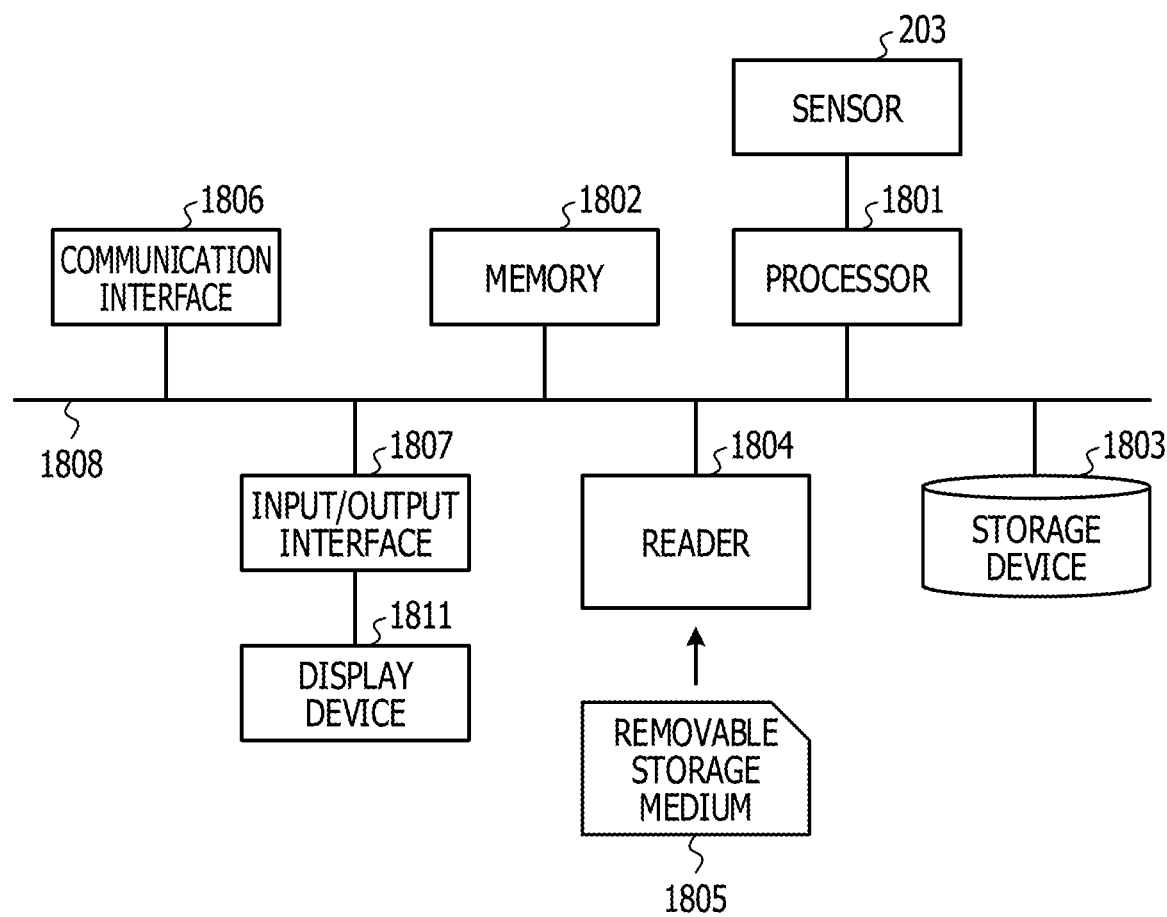
FIG. 18 exemplifies a hardware configuration of a computer for realizing the information processing device and the terminal according to the embodiment.

FIG. 18 exemplifies a hardware configuration of a computer 1800 for realizing the information processing device 201 and the terminal 202 according to the embodiment. The hardware configuration for realizing the information processing device 201 and the terminal 202 illustrated in FIG. 18 includes, for example, a processor 1801, memory 1802, a storage device 1803, a reader 1804, a communication interface 1806, and an input/output interface 1807. The hardware configuration for realizing the information processing device 201 and the terminal 202 illustrated in FIG. 18 may further include a display device 1811 and the sensor 203. The processor 1801, the memory 1802, the storage device 1803, the reader 1804, the communication interface 1806, and the input/output interface 1807 are connected to one another through, for example, a bus 1808.

The processor 1801 may be, for example, a single processor, multiple processors, or a multi-core processor. For example, the processor 1801 utilizes the memory 1802 to execute a program including a plurality of instructions in which procedures of the above-described operating flows are described, thereby the processor 1801 provides a subset or all of the functions of the controller 301 or the controller 401. For example, the processor 1801 of the information processing device 201 reads and executes a program that is stored in the storage device 1803 and includes the plurality of instructions, thereby the processor 1801 functions as the computing section 311, the output section 312, and the correcting section 313. The storage section 302 or the storage section 402 includes, for example, the memory 1802, the storage device 1803 and a removable storage medium 1805. The storage device 1803 of the information processing device 201 may store, for example, the task attribute information 600 and the change history information 1400.

The memory 1802 is, for example, semiconductor memory and may include a read-only memory (ROM) area and a random-access memory (RAM) area. The storage device 1803 is, for example, a hard-disk drive, semiconductor memory such as flash memory, or an external storage device.

The reader 1804 accesses the removable storage medium 1805 in accordance with an instruction from the processor 1801. The removable storage medium 1805 is realized by, for example, a semiconductor device (such as a Universal Serial Bus (USB) memory or a secure digital (SD) card) or the like.

The communication interface 1806 is a communication device that transmits/receives data through a network in accordance with instructions from the processor 1801. The communication section 303 and the communication section 403 are, for example, the communication interface 1806. The input/output interface 1807 may be, for example, an interface between an input device and an output device. The input device is, for example, a device accepting instructions from the user such as a keyboard or a mouse. The output device may be, for example, the display device 1811 such as a display or an audio device such as a speaker. The display device 1811 may be implemented as a touch screen into which the display device 1811 and the input device are integrated. The display device 1811 is, for example, an example of the display device 404. The sensor 203 may be any of a variety of sensors such as, for example, a GPS device, an acceleration sensor, a clock, and a vital sensor in accordance with the real world information to be obtained.

For example, the programs according to the embodiment are provided to the information processing device 201 and the terminal 202 in any of the following forms.

1. A subset or all of the programs are installed in advance in the storage device 1803.
2. A subset or all of the programs are provided from the removable storage medium 1805.
3. A subset or all of the programs are provided from a server such as a program server.

The hardware configuration of the computer 1800 for realizing the information processing device 201 or the terminal 202 described with reference to FIG. 18 is merely exemplary. The embodiment is not limited to this. For example, a subset or all of the functions of the above-described functional sections may be implemented as hardware such as a field programmable gate array (FPGA) or a system-on-a-chip (SoC).

Some embodiments have been described above. However, the embodiments are not limited to the above-described embodiments. It is to be appreciated that the embodiments include a number of types of variations and alternatives of the above-described embodiments. For example, it would be appreciated that various types of embodiments are able to be embodied by modifying the elements without departing from the scope of the gist of the embodiments. It would also be appreciated that various types of embodiments are able to be implemented by appropriately combining a plurality of the elements disclosed according to the above-described embodiment. Also, one skilled in the art would appreciate that various types of embodiments are able to be implemented by deleting or replacing a subset of the elements out of all the elements described according to the embodiment or adding an element or elements to the elements described according to the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An action support device comprising:
one or more memories; and
one or more processors coupled to the one or more memories and the one or more processors configured to
calculate, in response to detecting deviation of user's action from a first flow, a plurality of degrees of similarity between the first flow and each flow of a plurality of flows generated by changing the first flow,
select a second flow which is the highest degree of similarity among plurality of degrees of similarity from among the plurality of flows, and
output the selected second flow.

2. The action support device according to claim 1, wherein
each degree of the plurality of degrees of similarity includes a particular degree of similarity calculated on the basis of a number of times of change processing required to change the first flow into each flow of the plurality of flows.

3. The action support device according to claim 2, wherein
the particular degree of similarity is calculated on the basis of whether a type of the change processing is moving, inserting, or deleting.

4. The action support device according to claim 1, wherein
each degree of the plurality of the degrees of similarity is calculated on the basis of a history of change having been made to the first flow in the past.

5. The action support device according to claim 1, wherein
each degree of the plurality of degrees of similarity includes a particular degree of similarity calculated in accordance with, when two character strings corresponding to two continuous tasks in each of the plurality of flows are arranged in a vector space, a distance between the two character strings.

6. The action support device according to claim 1, wherein
each degree of the plurality of degrees of similarity includes a particular degree of similarity calculated in accordance with a geographical distance between positions corresponding to two continuous tasks in each flow of the plurality of flows.

7. A computer-implemented action support method comprising:
calculating, in response to detecting deviation of user's action from a first flow, a plurality of degrees of similarity between the first flow and each flow of a plurality of flows generated by changing the first flow, selecting a second flow which is the highest degree of similarity among plurality of degrees of similarity from among the plurality of flows, and outputting the selected second flow.

8. The action support method according to claim 7, wherein each degree of the plurality of degrees of similarity includes a particular degree of similarity calculated on the basis of a number of times of change processing required to change the first flow into each of the plurality of flows.

9. The action support method according to claim 8, wherein the particular degree of similarity is calculated on the basis of whether a type of the change processing is moving, inserting, or deleting.

10. The action support method according to claim 7, wherein each degree of the plurality of the degrees of similarity is calculated on the basis of a history of change having been made to the first flow in the past.

11. The action support method according to claim 8, wherein each degree of the plurality of degrees of similarity includes a particular degree of similarity calculated in accordance with, when two character strings corresponding to two continuous tasks in each flow of the plurality of flows are arranged in a vector space, a distance between the two character strings.

12. The action support device according to claim 8, wherein each degree of the plurality of degrees of similarity includes a particular degree of similarity calculated in accordance with a geographical distance between positions corresponding to two continuous tasks in each flow of the plurality of flows.

13. A non-transitory computer-readable medium storing instructions executable by one or more computer, the instructions comprising:

one or more instructions for calculating, in response to detecting deviation of user's action from a first flow, a plurality of degrees of similarity between the first flow and each flow of a plurality of flows generated by changing the first flow;

one or more instructions for selecting a second flow which is the highest degree of similarity among plurality of degrees of similarity from among the plurality of flows; and one or more instructions for outputting the selected second flow.

* * * * *